3,136,051
CLADDING OF NUCLEAR FUEL ELEMENTS
Frank B. Quinlan and Robert G. Wheeler, Richland, Wash., assignors to the United States of America as represented by the United States Atomic Energy Commission
No Drawing. Filed Oct. 11, 1962, Ser. No. 230,014
6 Claims. (Cl. 29—471.5)

This invention deals with a process of joining ferrous alloys to uranium, zirconium or alloys of uranium with zirconium. In particular it relates to the production of nuclear fuel elements or other components of nuclear reactors.

Attempts have been made to produce fuel element cores of uranium or uranium-zirconium alloys clad in stainless steel by roll-bonding the steel to the core at elevated temperatures. However, in most instances, in particular in the case of uranium-containing cores, an intermediate metallic compound was formed at the interface that was brittle and had a very reduced melting point, which impaired the strength of the bond. It is most important, of course, that the core be protected well during its entire service life, so that the coolant of the reactor, which in many reactors is water, does not have any access to, and cannot react with, the fuel of the core.

Other components of nuclear reactors are formed of zirconium or, more frequently, the alloys zircaloy-2 or zircaloy-4, with stainless steel or other ferrous metals bonded thereto. The steel may constitute a scuff-resistant surface on a zircaloy element; for example, fuel elements clad in zircaloy-2 may have carbon steel contact members on their exterior surfaces. In other cases a stainless steel element may be joined to a zircaloy element.

It is an object of this invention to provide a process for joining ferrous alloys to uranium, zirconium, alloys containing predominantly zirconium, or uranium-zirconium alloys.

It is another object of this invention to provide a process for cladding uranium- or zirconium-containing elements with stainless steel so that they can then be roll-bonded at elevated temperature without there being the formation of a brittle compound in the interface.

It is also an object of this invention to provide a process for cladding uranium- or zirconium-containing fuel elements with stainless steel whereby an element of satisfactory heat conductivity is obtained.

It is another object of this invention to provide a process for cladding uranium- or zirconium-containing fuel elements with stainless steel by which the strong bond and good heat conductivity are retained during reactor use.

It is also an object of this invention to provide a process for jacketing a zirconium- and/or uranium-containing core with stainless steel by which it is practically completely protected against corrosion.

It was found that by applying an intermediate bonding layer of molybdenum metal, between core and ferrous metal jacket, the formation of brittle compounds is prevented and an extremely strong bond is obtained between the ferrous metal of the jacket and the bonding layer, on one hand, and the bonding layer and the core, on the other hand, so that an integral element is obtained.

The invention comprises forming a sandwich-like assembly of a core of zirconium- or uranium-base metal, molybdenum foil thereabove and ferrous plates over said molybdenum foil, encasing the sandwich in an evacuated container, sealing the container, heating the unit comprising the container and the assembly to a suitable temperature, rapidly forging the unit so that the thickness of the sandwich is reduced by about 50%, heating again to the specified temperature for about two hours, cross-rolling the unit while maintaining said elevated temperature to reduce the thickness of the sandwich to about 20% of the original thickness, soaking the unit for about one hour at said elevated temperature, cooling the unit in an atmosphere of air and removing the container from the sandwich.

In the preceding paragraph we have referred to a "suitable temperature." We can operate over the range of from 600 to 1000° C. Since, however, uranium has an alpha-to-beta-phase transformation point at 660° C., it is frequently desirable to use a temperature in the range of 600 to 660° C. We have found that entirely satisfactory results are obtained at 640° C. This allows some leeway for temperature rise due to mechanical working in the subsequent rolling step without exceeding the 660-degree limit specified above.

When the element to be joined does not contain uranium, the above limit does not apply and temperatures up to 1000 degrees can be readily employed. There is some correlation between temperature and the time of working. The higher the temperature, the shorter the working period, and the less the mechanical working required.

EXAMPLE I

Bonding of Ferrous Alloys to Zircaloy-2

A sheet of zircaloy-2 (1.4% tin, 0.14% iron, 0.1% chromium, 0.05% nickel, balance zirconium) about 35 mils thick, ¾ inch wide and 3 inches long was covered on both sides with 2-mil-thick molybdenum foil and sandwiched between two sheets of 406 stainless steel (20% chromium, 9.5% nickel, balance iron) about 50 mils thick and slightly larger in width and length than the zircaloy sheet. This sandwich was placed in a closely fitting 304 stainless steel "picture frame" container and sealed by welding under vacuum. The entire unit (container and contents) was heated to 640° C. and rapidly reduced approximately 50% in thickness by use of a forge. The reduced compact was soaked for two hours at 640° C. and then cross-rolled until the thickness of the sandwich had been reduced to 20% of its original thickness. The cross-rolling was done at 640° C. The unit was once more soaked for one hour at 640° C. and then cooled in air. Thereafter the 304 stainless steel "picture frame" was removed from the sandwich. The sandwich was then subjected to a metallographic examination, and it was found that diffusion bonds were formed between the zircaloy, molybdenum and stainless steel. The sandwich was also subjected to bending and tearing tests, and it was found that there was no tendency for separation of the layers.

EXAMPLE II

Bonding of Ferrous Alloys to Zircaloy-2

A sheet of zircaloy-2 was covered as described in Example I, but on one side only, with 2-mil molybdenum foil. A single sheet of low-carbon steel about 50 mils thick and the same size as the zircaloy was placed on the molybdenum foil. The process was then carried out in the same manner as in Example I with the same results.

The bimetallic material produced is subsequently cut to size and spot-welded to zircaloy-clad fuel elements to form supports of the type shown in U.S. Patent No. 2,990,359, granted on June 27, 1961, to W. L. Wyman. It is desirable to interpose a mild-steel bearing surface between a zircaloy-clad fuel element and a zircaloy process tube to permit galling, as explained in the U.S. Atomic-Energy-Commission-Report HW–68195 by J. W. Weber. The zircaloy surface of the bimetallic strip is readily welded to the zircaloy cladding of the fuel element.

EXAMPLE III

Bonding of Ferrous Alloys to Uranium

The process of Example I was repeated except that uranium was substituted for zircaloy in the sandwich. The same results were secured as given in Example I.

Likewise, the method can be successfully applied to the cladding with stainless steel of a core consisting of 5% by weight of highly enriched uranium and 95% of zirconium and that of a core consisting of 98% of natural uranium and 2% zirconium.

While we have given three examples, it will be understood that our invention is not limited thereto. The invention should be limited solely by the scope of the appended claims.

What is claimed is:

1. A process of joining a ferrous metal to a core of a metal selected from the group consisting of uranium, zirconium, uranium-base alloys and zirconium-base alloys, comprising superimposing molybdenum foil on said core all along the surfaces to be joined to the ferrous metal; placing plates of ferrous metal onto said molybdenum foil, whereby a sandwich-like assembly is formed; encasing the assembly in an evacuated container; sealing the container; heating the encased assembly to between 600 and 1000° C.; rapidly forging the thus-heated assembly until its thickness is reduced to about 50%; bringing the assembly again to a temperature of between 600 and 1000° C. and maintaining said temperature for approximately two hours; cross-rolling the encased assembly until its thickness is reduced to about 20% of its original thickness; maintaining the temperature of between 600 and 1000° C. for about another hour; cooling the encased assembly in air; and removing the container from the assembly.

2. The process of claim 1 wherein the core predominantly contains uranium and the temperature is between 600 and 660° C.

3. The process of claim 2 wherein the process is carried out at about 640° C.

4. The process of claim 2 wherein the core consists of a binary uranium alloy containing a small amount of zirconium.

5. The process of claim 1 wherein the core consists of a binary zirconium alloy containing uranium and the elevated temperature ranges between 600 and 660° C.

6. The process of claim 1 wherein the core is a zirconium-base alloy, the plates are formed of stainless steel and the elevated temperature used is about 640° C.

References Cited in the file of this patent

UNITED STATES PATENTS

| | | |
|---|---|---|
| 2,820,751 | Saller | Jan. 21, 1958 |
| 2,837,818 | Storchheim | June 10, 1958 |
| 2,863,816 | Stacy | Dec. 9, 1958 |
| 2,894,320 | Gurinsky et al. | July 14, 1959 |
| 2,928,168 | Gray | Mar. 15, 1960 |